J. I. UMSTED.
DRIVING GEAR AND TRANSMISSION.
APPLICATION FILED JULY 30, 1917.
1,306,205.
Patented June 10, 1919.
2 SHEETS—SHEET 1.
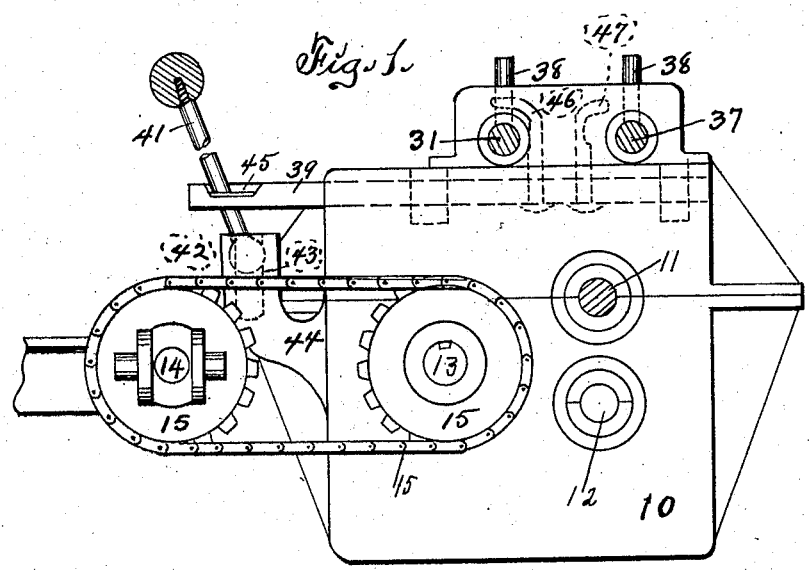
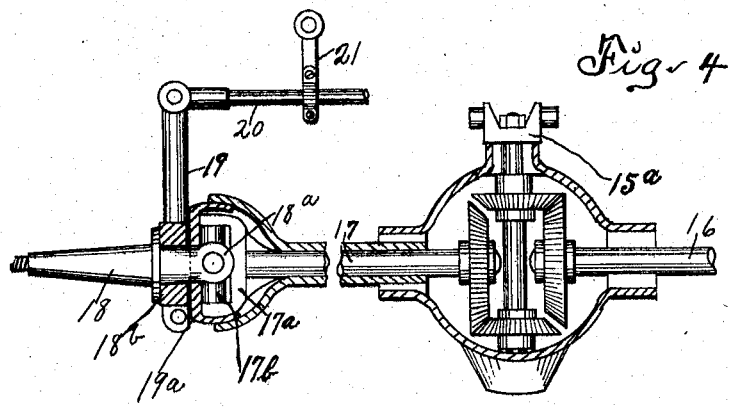
Inventor:
Judd I. Umsted
By Silas Le Sweet
Atty J. I. UMSTED.
DRIVING GEAR AND TRANSMISSION.
APPLICATION FILED JULY 30, 1917.
1,306,205.
Patented June 10, 1919.
2 SHEETS—SHEET 2.
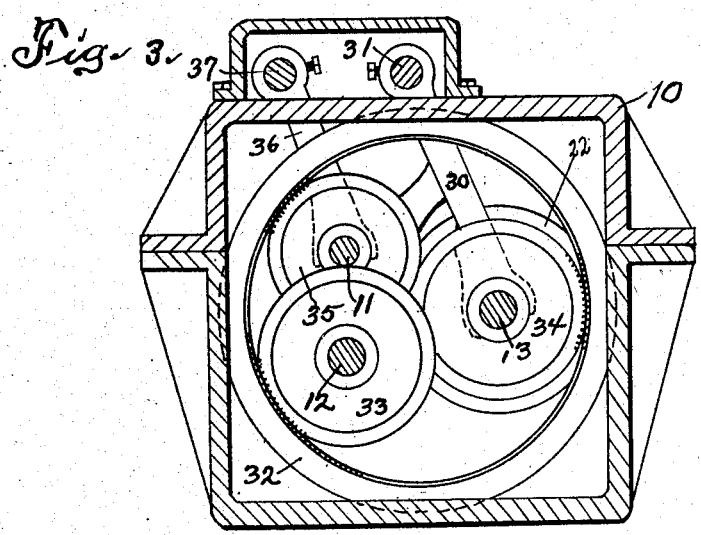
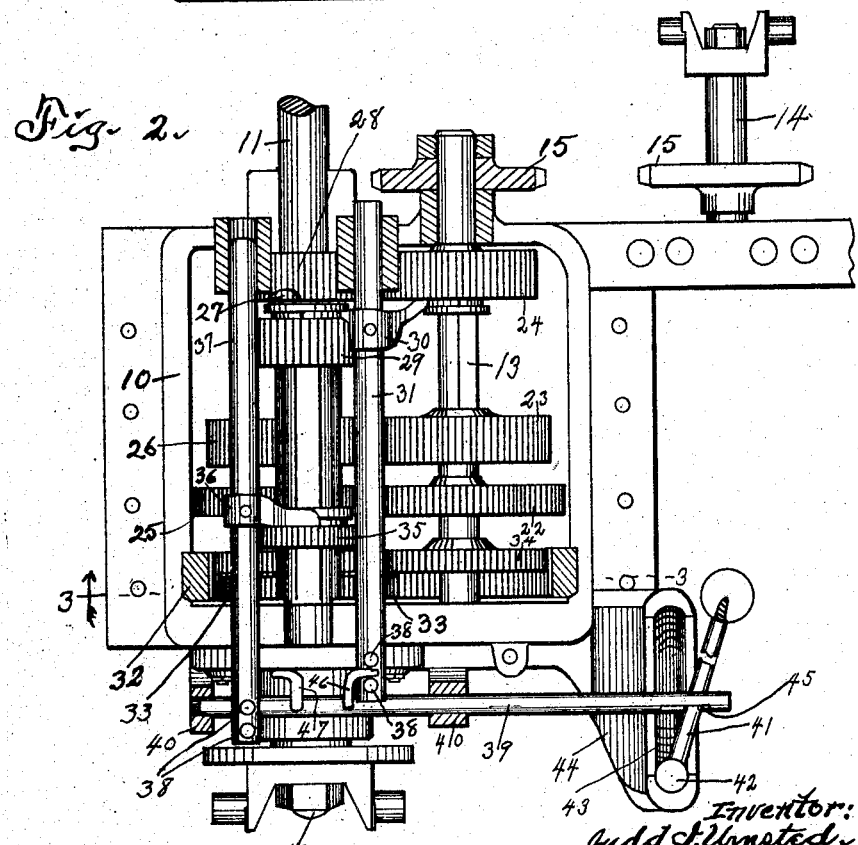

UNITED STATES PATENT OFFICE.

JUDD I. UMSTED, OF DAYTON, IOWA.

DRIVING-GEAR AND TRANSMISSION.

1,306,205.    Specification of Letters Patent.    Patented June 10, 1919.

Application filed July 30, 1917. Serial No. 183,416.

*To all whom it may concern:*

Be it known that I, JUDD I. UMSTED, citizen of the United States of America, and resident of Dayton, Webster county, Iowa, have invented a new and useful Driving-Gear and Transmission, of which the following is a specification.

The object of this invention is to provide improved means for driving four wheels of a motor carriage conjunctively subject only to variations through differential gearing.

A further object of this invention is to provide an improved construction for transmission mechanism whereby power may be transmitted in varying speeds to the traction devices; the speed of the front and rear axles or driving shafts in said axles being the same.

A further object of this invention is to provide means for taking power from a transmission mechanism in opposite directions.

A further object of this invention is to provide a unitary transmission mechanism common to a multiplicity of followers adapted to be driven through said mechanism at the same speed.

A further object of this invention is to provide a unitary transmission mechanism common to a multiplicity of followers adapted to be driven through said mechanism at the same speed; the transmission mechanism being adapted for varying such speed and the direction of application thereof, such as low, intermediate, high and reverse.

My invention consists in the construction, arrangement and combination of elements hereinafter set forth, pointed out in my claims and illustrated by the accompanying drawing, in which—

Figure 1 is a front elevation, partly in section, of a transmission mechanism and gear power transmission device embracing my improvements. Fig. 2 is a plan of the same partly in section, a portion of a gear and a portion of a shaft being broken away to reveal an underlying gear. Fig. 3 is a cross-section on the indicated line 3—3 of Fig. 2. Fig. 4 is a detail plan, partly in section, of a portion of the front axle assembly, steering mechanism and differential gearing therefor.

In the construction of the apparatus as shown it is assumed that a chassis will be employed having suitable traction wheels, preferably four in number, a rear axle assembly having a differential gearing of suitable form selected from many now common and well known, a front axle assembly as hereinafter described, spring supporting devices and a body of any suitable construction and form carried by the chassis, a suitable prime mover such as an explosion engine of any desired size and form, and suitable controlling devices, a portion only of which are referred to hereinafter as the steering mechanism and has reference to the steering column and manually rotated shaft mounted therein and adapted to be connected by suitable means to steering wheels of the chassis.

The transmission mechanism is carried in and by a housing 10, which is here shown conventionally and may be varied at will as to size, shape and constituents. The casing 10 may be located at any suitable place, preferably nearer to the engine than to the rear axle and within reach of the driver for convenience in operating. It is to be understood, however, that this is not important since it is now common and well known to connect spaced controllers and transmission devices by suitable rods. A driving shaft 11 is journaled in the transmission case or housing 10 and is adapted to be connected at one end, preferably the upper end as shown in Fig. 2, to the crank shaft of the prime mover (not shown), and such connection may be in any suitable way and span any desired distance. Jack shafts or countershafts 12, 13 are journaled in the transmission case or housing 10 parallel with the driving shaft 11. All of the shafts 11, 12, 13 are secured against endwise movement in the housing. The jack shaft 12 is adapted to be secured at one end, preferably the lower end in Fig. 2, to a power transmission shaft of common form (not shown) leading to the differential mechanism above mentioned as being included in the rear axle assembly of the chassis, and such connection may be made in any suitable manner and span any desired distance. A stub shaft 14 is mounted parallel with the shaft 13 outside of the housing 10 and sprocket gearing 15 connects said shafts, preferably at the forward end as shown at the top of Fig. 2. The stub shaft 14 is adapted to be secured by a connecting shaft or driver (not shown) of common form to the driving member 15$^a$ of a differential gear assembly (Fig. 4) included in the front axle assembly. The differential gear assembly in the front axle assembly is identical in construction with that common and well known in use on rear axle assemblies of motor cars and is here shown conventionally without respect to refinements in detail of manufacture or arrangement, and it is its function to drive front axle members 16, 17 on the outer ends of which are mounted spindles carrying steering wheels of the chassis, one of said spindles being shown and designated by the numeral 18. The spindles 18 are provided with steering arms, one of which is shown and designated by the numeral 19 in Fig. 4, and said steering arms may be pivotally connected by a steering rod 20 adapted to be acted upon and reciprocated or held in any given position by manually operated steering mechanism partly shown in conventional form and designated by the numeral 21. The outer ends of the axle sections 16, 17 are formed with yokes, one of which is shown in Fig. 4 and designated by the numeral 17ª. A block 17ᵇ is pivoted in the yoke 17ª and the spindle 18 is formed with a fork 18ª at right angles to the fork 17ª, which embraces the block 17ᵇ and is pivoted thereto. The axes of articulation of the fork 17ᵇ and fork 18ª are thus arranged at right angles to each other. The spindle 18 also is formed with a peripheral flange 18ᵇ and the crank arm 19 embraces the shank of the spindle between said flange and the fork 18ª by means of a clamping yoke 19ª. Thus is provision made for rotation of the shank of the spindle 18 in the clamping yoke of the crank arm 19 and such construction permits of the rotation of the spindle and axle regardless of the alinement or inclination of the spindle relative to the axle. Suitable provision may be made in connection with the housing of the axle members 16, 17 for maintaining approximately horizontal positioning of the spindles, such construction being common and well known and illustrated in Letters Patent No. 939,795 or 1,012,936.

Pinions 22, 23 and 24 of varying sizes are mounted on the jack shaft 13 and spaced apart longitudinally thereof. The pinions 22, 23 are fixed to the shaft 13 while the pinion 24 is mounted for reciprocation on said shaft. Pinions 25, 26, and 27 are mounted on the jack shaft 12 laterally opposite to but disconnected from the pinions 22, 23 and 24. The pinions 25, 26 are fixed to the shaft 12 while the pinion 27 is arranged for reciprocation on said shaft. A driving gear 28 is mounted rigidly on the driving shaft 11 and a driving gear 29 is mounted for reciprocation on the driving shaft 11. A three-armed clutch spider 30 is fixed to a shifting rod 31 mounted for reciprocation in the housing parallel with the shafts therein and the extremities of the arms of said spiders are forked or otherwise suitably constructed to engage portions of the pinions 24 and 27 and the driving gear 29 and shift them longitudinally of their respective shafts at times. An internal gear 32 is journaled in the housing or transmission case 10 and surrounds all of the shafts therein. A pinion 33 is mounted rigidly on the jack shaft 12 and meshes with the internal gear 32. A pinion 34 is fixed to the jack shaft 13 and meshes with the internal gear 32. A driving gear 35 is mounted for reciprocation on the driving shaft 11 and is adapted to mesh at times with the internal gear, with the pinions 22 and 25, or be at rest between said gear and pinions, selectively. A shifting arm 36 is mounted on a shifting rod 37, the latter being mounted for reciprocation in the transmission case 10 parallel with the shifting rod 31 and shafts in said case. The shifting rods 31 and 37 project through and outside of the transmission case or housing 10 and are formed with upwardly extending spaced studs 38 arranged in pairs on their outer ends. An operating bar 39 is mounted for oscillation rotatively on its longitudinal axis and also is arranged for rectilinear reciprocation in suitable bearings 40 which may be carried by the transmission case 10. A shifting lever or controller 41 is fulcrumed by means of a ball 42 on its lower end in an arcuate channel or groove 43 formed in and opening upwardly from a bracket 44, which may be carried by the transmission case 10. The shifting lever or controller 41 is secured to the outer end portion of the operating bar 39 as by extending said lever loosely through a slot 45 in and arranged longitudinally of said bar. An H-slot housing (not shown) of common form may be superposed relative to the bracket 44 and in embracing relation to the lever or controller 41 to guide the operator in manipulating the lever. The operating bar 39 is formed with upwardly extending hooked arms or hooks 46, 47 spaced apart and having their extremities turned away from each other. The hooked arms 46, 47 extend across the horizontal plane of the shifting bars 31 and 37 and are adapted to extend selectively within pairs of the studs 38. In one position of the operating bar 39 the hook 46 will engage the studs on the bar 31; in another position the hook 47 will engage the studs on the shifting bar 37; and in yet another position both hooks will be disengaged from said studs and neutral relative to any operation of the shifting bars.

The mechanism as illustrated is connected in "high;" that is to say the movement of the driving shaft 11 is communicated through the gear 28 to the pinions 24 and 27 to the end of rotating the shafts 13 and 12 respectively in the same direction and at approximately the same speed as that of the engine shaft, although it may be reduced or increased by varying the size of the driving gear 28 relative to a size common to said pinions. When it is desired to shift from high to intermediate speed the lever 41 is moved rearwardly at its upper end and the ball 42 travels from the end shown to the center of the channel 43. Such movement of the lever 41 turns the operating bar 39 on its axis and causes the arm 46 to move the shifting bar 31 rearwardly. The shifting bar 31 in turn moves the spider 30 toward the center of the transmission case and withdraws the pinions 24 and 27 from meshing with the driving gear 28 and also moves the driving gear 29 nearer to the pinions 23 and 26. A continuation of rearward movement of the upper end of the lever 41 causes the shifting bar 31 and spider 30 to move the driving gear 29 into mesh with the pinions 23 and 26 and said pinions 23 and 26 being of relatively larger diameter than the pinions 24 and 27, and the gear 29 being of relatively smaller diameter than the gear 28, the speed transmitted by such meshing is reduced relative to the speed of the engine. When it is desired to vary the speed from intermediate to low the lever 41 is moved so that the ball 42 is in the center of the channel 43; the lever 41 is then moved laterally, fulcruming on the ball 42 in the channel, in such manner as to move the bar 39 longitudinally and disconnect the hook 46 from the studs on the bar 31 and connect the hook 47 with the studs 38 on the bar 37; which done the lever 41 is moved forwardly at its upper end (the ball 42 traveling toward and to the rear end of the channel 43), thus turning the bar 39 on its axis and causing the hook 47 to move the shifting bar 37 and spider 36 so as to bring the driving gear 35 into mesh with the pinions 22 and 25. The pinions 22 and 25, being of a common diameter greater than that of the pinions 23 and 26, and the driving gear 35 being of less diameter than the driving gear 29, it follows that the speed transmitted by this connection will be less than the speed next previously described in proportion to the speed of the driving shaft. When it is desired to shift from low to reverse, the movement of the lever 41 is rearwardly at its upper end so as to cause the bar 39 to rotate on its axis and move the shifting bar 37 and arm 36 so as to disengage the driving gear 35 from the pinions 22 and 25 and bring it into mesh with the internal gear 32. Inasmuch as the internal gear 32 is at all times in mesh with the pinions 33 and 34, such engagement of the driving gear 35 therewith reverses the direction of travel of the jack shafts 12 and 13 and all of the following mechanisms connected therewith. Disengagement of the gears may be effected at any time by forward or rearward movement of the lever 41 to neutral position, and disengagement of all of the transmission devices may be effected by moving the lever to an upright or neutral position in respect of inclination laterally of the path of travel.

Claims:

1. In a driving gear and transmission, the combination of a driving shaft and a plurality of countershafts parallel therewith, said countershafts being adapted for respective connection to followers to be driven, a driving gear fixed to the driving shaft, gears feathered to the countershafts and adapted to be engaged with said driving gear, gears fixed to said countershafts and differing in size from the feathered gears, and means for connecting the latter gears with the driving shaft when the feathered gears are disconnected from the driving gear.

2. In a driving gear and transmission, the combination of a driving shaft and a plurality of countershafts parallel therewith, said countershafts being adapted for respective connection to followers to be driven, a driving gear fixed to the driving shaft, gears feathered to the countershafts and adapted to be engaged with said driving gear, gears fixed to said countershafts and differing in size from the feathered gears, means for connecting the latter gears with the driving shaft when the feathered gears are disconnected from the driving gear, further gears fixed to said countershafts and differing in size from the former gears on said countershafts, and means for engaging the latter gears with the driving shaft when the former gears are disconnected.

3. In a driving gear and transmission, the combination of a driving shaft and a plurality of countershafts parallel therewith, said countershafts being adapted for respective connection to followers to be driven, a driving gear fixed to the driving shaft, gears feathered to the countershafts and adapted to be engaged with said driving gear, gears fixed to said countershafts and differing in size from the feathered gears, means for connecting the latter gears with the driving shaft when the feathered gears are disconnected from the driving gear, further gears fixed to said countershafts and differing in size from the former gears on said countershafts, means for engaging the latter gears with the driving shaft when the former gears are disconnected, an internal gear surrounding all of said shafts, and gears fixed to the countershafts and meshing continuously with the internal gear, said last mentioned gears being adapted for connecting said internal gear with the driving shaft when all of the former gears on the countershafts are disconnected from said driving shaft.

4. In a driving gear and transmission, the combination of a driving shaft and a plurality of countershafts parallel therewith, said countershafts being adapted for connection respectively to separate followers, a primary driving gear fixed to the driving shaft, primary follower gears feathered to the countershafts and adapted for engagement with the primary driving gear, secondary and tertiary follower gears fixed to said countershafts, and secondary and tertiary driving gears feathered to the driving shaft and adapted for selective engagement with the secondary and tertiary follower gears.

5. In a driving gear and transmission, the combination of a driving shaft and a plurality of countershafts parallel therewith, said countershafts being adapted for connection respectively to separate followers, a primary driving gear fixed to the driving shaft, primary follower gears feathered to the countershafts and adapted for engagement with the primary driving gear, secondary and tertiary follower gears fixed to said countershafts, secondary and tertiary driving gears feathered to the driving shaft and adapted for selective engagement with the secondary and tertiary follower gears, reverse gears fixed to said countershafts, and an internal gear meshing with said reverse gears, the tertiary driving gear being adapted for engagement with said internal gear.

6. In a driving gear and transmission, a plurality of countershafts adapted to be driven in the same direction at selectively varying speeds relative to the speed of a driver, one of said countershafts being adapted to be connected directly to a follower, and sprocket and chain gearing adapted to connect the other countershaft to a separate follower.

Signed by me at Dayton, Iowa, this 14th day of July, 1917.

JUDD I. UMSTED.

Copies of this patent may be obtained for five cents each, by addressing the "Commissioner of Patents, Washington, D. C."